(12) United States Patent
Semotuk (10) Patent No.: US 6,679,542 B1
(45) Date of Patent: Jan. 20, 2004

(54) FOLDING CAMPER FOR PICKUP TRUCKS

(76) Inventor: Thomas Daniel Semotuk, 11316 Slater, Overland Park, KS (US) 66210

( * ) Notice: Subject to any disclaimer, the term of this patent is extended or adjusted under 35 U.S.C. 154(b) by 0 days.

(21) Appl. No.: 10/317,656

(22) Filed: Dec. 12, 2002

(51) Int. Cl.[7] .................................................. B60P 3/32
(52) U.S. Cl. ........................ 296/174; 296/165; 296/173
(58) Field of Search ................................. 296/174, 159, 296/161, 164, 165, 168, 169, 171, 173, 175, 176, 26.04, 26.05, 26.12, 26.15; 135/88.01, 88.03, 88.13, 143

(56) References Cited

U.S. PATENT DOCUMENTS

| | | | | |
|---|---|---|---|---|
| 1,466,224 A | * | 8/1923 | Hans | |
| 1,568,895 A | * | 1/1926 | Lyons | |
| 1,578,390 A | * | 3/1926 | Brown | |
| 3,507,535 A | * | 4/1970 | Wallace | |
| 3,749,439 A | * | 7/1973 | Ferguson | |
| 4,165,117 A | * | 8/1979 | Kaiser | |
| 4,420,182 A | * | 12/1983 | Kaneshiro | 296/168 |
| 4,807,924 A | * | 2/1989 | Kottke | 296/164 |
| 4,943,108 A | | 7/1990 | Turnbull | |
| 5,704,677 A | * | 1/1998 | Steury et al. | 296/171 |
| 5,769,485 A | * | 6/1998 | Bontrager et al. | 296/171 |
| 6,170,502 B1 | | 1/2001 | Pullen | |
| 6,217,106 B1 | * | 4/2001 | Reckner, Jr. | 296/173 |
| 6,283,536 B1 | * | 9/2001 | Muzyka et al. | 296/165 |
| 6,439,647 B1 | * | 8/2002 | Baldwin | 296/165 |
| 6,443,516 B2 | * | 9/2002 | Lambright | 296/26.05 |
| 2002/0140252 A1 | * | 10/2002 | Neville | 296/164 |

* cited by examiner

Primary Examiner—D. Glenn Dayoan
Assistant Examiner—H. Gutman

(57) ABSTRACT

A folding camper (15) is provided for a pickup truck (20). A pair of side wings (22) are pivotally attached to a base assembly (10) that rests on the floor of the pickup truck bed. A roof (28) is attached to a roof lifting mechanism (30). Enclosures (32), (38), and (42) enclose the area between base assembly (10) and roof (28) when expanded. Doors (34) and (36) provide access to the interior. Slanted jacks (47) and (48) lift the camper off the pickup truck bed. Straps (62) and braces (64) and (66) stabilize the camper (15). Roof racks (46) are attached to roof (28) for long objects. When closed, side wings (22) are folded upward, and enclosures (32), (38), and (42) are folded inward. Roof (28) is lowered to rest on base assembly (10) and to overlap side wings (22). Lower door (36) is operable and the interior of camper (15) is available for transport or storage use.

7 Claims, 8 Drawing Sheets

Fig 8

FOLDING CAMPER FOR PICKUP TRUCKS

BACKGROUND OF THE INVENTION

The present invention relates generally to a folding camper that rests on the floor of a pickup truck bed and that can be used as a utility enclosure for storage and transport when closed and expands into a large enclosure for habitation that can be used on or off the pickup truck.

Folding campers have been in use for years. Typically a conventional camper designed for pickup trucks has a floor, front and rear walls, sidewalls and a roof forming a rigid rectangular structure. The main problem is that campers are wider and higher than the truck they rest upon. Consequently they obscure the rear view of the driver when in motion contributing to safety concerns; they are not aerodynamic and increase wind resistance and increase fuel consumption; they raise the center of gravity and provide a large sail area in high winds that serves to destabilize the vehicle; they will not fit within a typical residential garage; they may be subject to road and bridge restrictions; they are difficult to remove from the vehicle; and they are not intended for use off the vehicle. Various methods have been tried to improve the campers by installing some form of roof lowering mechanism to reduce the overall height of the vehicle when closed. These efforts have not addressed the other disadvantages listed. Examples of patents that are illustrative of this prior art follow.

"U.S. Pat. No. 6,283,536 to Muzyka in which the inventor uses a system of multiple folding side wings that fold in upon themselves. This device requires numerous external supports and jacks to support it. It must extend horizontally beyond the sides of the vehicle in order for the vertical jacks to reach the ground. This obstructs rear vision and reduces clearance between the vehicle and other vehicles or obstructions thereby creating a safety hazard. It also increases the difficulty of putting the vehicle in a residential garage. The device is intended for conventional, full size pickup trucks, Wand is too large for compact trucks."

U.S. Pat. No. 6,170,502 to Pullen relies on a system of numerous chains, sprockets, cranks, and pulleys that require careful alignment, maintenance and lubrication and are prone to mechanical failure to elevate the roof. It requires removing and installing side frames that contain numerous receiving tubes that must be aligned. It requires positioning and attachment of tarps to hooks on the underside of the side platforms. The fold-down side beds are fastened directly to the top of the sidewall and therefore require greater height of the camper frame to obtain adequate bed size. The one-piece door also requires a rear wall of adequate height to allow an individual to enter. Therefore, it does not eliminate the high profile that contributes to increased wind resistance and fuel consumption; the high profile also contributes to dangerous instability conditions created by high side winds while in motion. The device is not intended for use off the vehicle; does not have an aerodynamic shape and does not conform to the aerodynamic contours of the vehicle. The device doesn't utilize all available truck bed space and is intended for conventional or full size pickup trucks, it is not suitable for compact trucks.

None of the prior art solves the disadvantages of inconvenience, degraded safety and poor fuel efficiency.

BRIEF SUMMARY OF THE INVENTION

A folding camper (15) for a compact or full sized, conventional pickup truck (20). A pair of side wings (22) are pivotally attached to a pair of side platforms (13) attached to a base assembly (10) that rests on the floor of the pickup truck bed. Side wings (22) fold down into a horizontal position and are supported from base assembly (10) by cables (24). Side wings (22) and side platforms (13) together provide a sleeping surface larger than either alone. A roof (28) is attached to a roof lifting mechanism (30), whereby the roof is raised and lowered. Side enclosures (42) and a pair of end enclosures (32) and (38) enclose the area between roof (28) and base assembly (10) when expanded, whereby a weather resistant enclosure is provided. Doors (34) and (36) provide access to the interior. Slanted jacks (47) and (48) are removably attached to lift the camper (15) off the pickup truck bed. Straps (62) and braces (64) and (66) are attached to stabilize the camper (15), whereby it may be used off the pickup truck (20). Roof racks (46) are attached to roof (28) for transporting long objects. When closed, side wings (22) are folded upward, enclosures (32), (38), and (42) are folded inward. Roof (28) is lowered to rest on base assembly (10) and to overlap side wings (22). Lower door (36) is operable and the interior of camper (15) is available for transport or storage use.

The objectives and advantages of the present expanding camper are:
- to provide an expandable enclosure for mounting on a vehicle that is simple to operate and can be expanded by a single person,
- to provide an aerodynamic front profile that reduces wind resistance when in motion to reduce fuel consumption,
- to provide a low side profile to reduce the influence of side winds and increase stability and safety,
- to provide an enclosure that can remain on the vehicle and be used for other purposes such as transport and storage while in a closed position,
- to provide a habitation resistant to wind and water when expanded,
- to utilize the structural properties of component materials to reduce weight and increase fuel efficiency,
- to provide for ease of removal from the vehicle by a single person,
- to provide lightweight bracing so that the camper can be used for habitation while off the vehicle,
- to utilize maximum space within the pickup truck bed,
- to provide a folding camper that can be used with a compact pickup truck as well as conventional, full sized trucks, to provide for transport of elongated or bulky objects such as canoes, boats, pipes, or ladders on the roof.

Other objectives of the present invention will become apparent to the reader from consideration of the drawings and ensuing description. It is intended that these objects and advantages are within the scope of the present invention.

To the accomplishment of the above and related objects this invention may be embodied in the form illustrated in the accompanying drawings. However, the drawings are illustrative only, and changes may be made in the specific construction illustrated and described within the scope of the appended claims.

REFERENCE NUMERALS IN THE DRAWINGS 10 base assembly
11 front wall
12 rear wall
13 side platform
14 inner side wall
15 folding camper
16 outer side wall
17 floor
18 structural sub-frame
19 bulkhead
20 pickup truck
21 storage enclosure
22 side wing
23 side wing continuous hinge
24 side wing cable
26 telescoping pole
28 roof
30 roof lifting mechanism
32 rear upper panel
34 upper door
36 lower door
38 front upper panel
42 side enclosure
44 stays
46 roof rack
47 slanted rear corner jack
48 slanted front corner jack
50 front fairing
52 pulley
53 lift cable
54 cable raceway
55 upright
56 winch
60 lower stay receptacle
61 upper stay receptacle
62 tension
64 rear brace
66 front brace

DETAILED DESCRIPTION OF THE INVENTION

Figure 1:
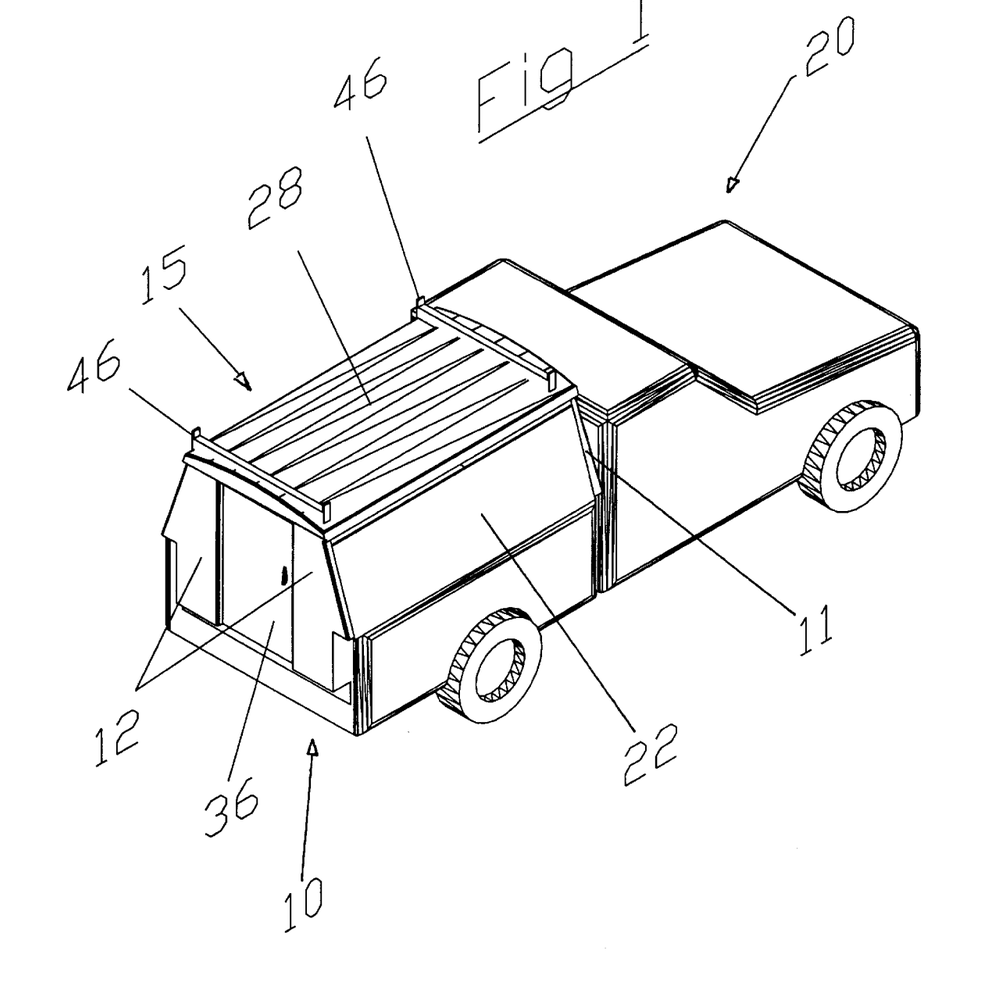
FIG. 1 shows a perspective view of the closed folding camper mounted in the bed of a pickup truck for transport and storage.

Description—FIG. 1

An embodiment of the present folding camper 15 is shown in FIG. 1 (perspective view). A base assembly 10 is positioned on the floor of the bed of a pickup truck 20. A pair of side wings 22 are folded upward and are resting against a rear wall 12 and a front wall 11. A roof 28 rests on rear wall 12, front wall 11, and side wings 22, whereby a weather resistant enclosure is created. A pair of roof racks 46 are attached to roof 28, whereby elongated objects can be secured and transported. A lower door 36 is pivotally attached to rear wall 12, whereby it can be used to access the interior of the folding camper 15 for storage and transport.

Operation—FIG. 1:

Folding camper 15 is positioned on the floor of the bed of pickup truck 20. Lower door 36 opens outward to allow access to the interior of the folded camper 15 for storage and transport. Elongated items are secured to roof racks 46 for transport.

Description—FIGS. 2 to 5

Figure 2:
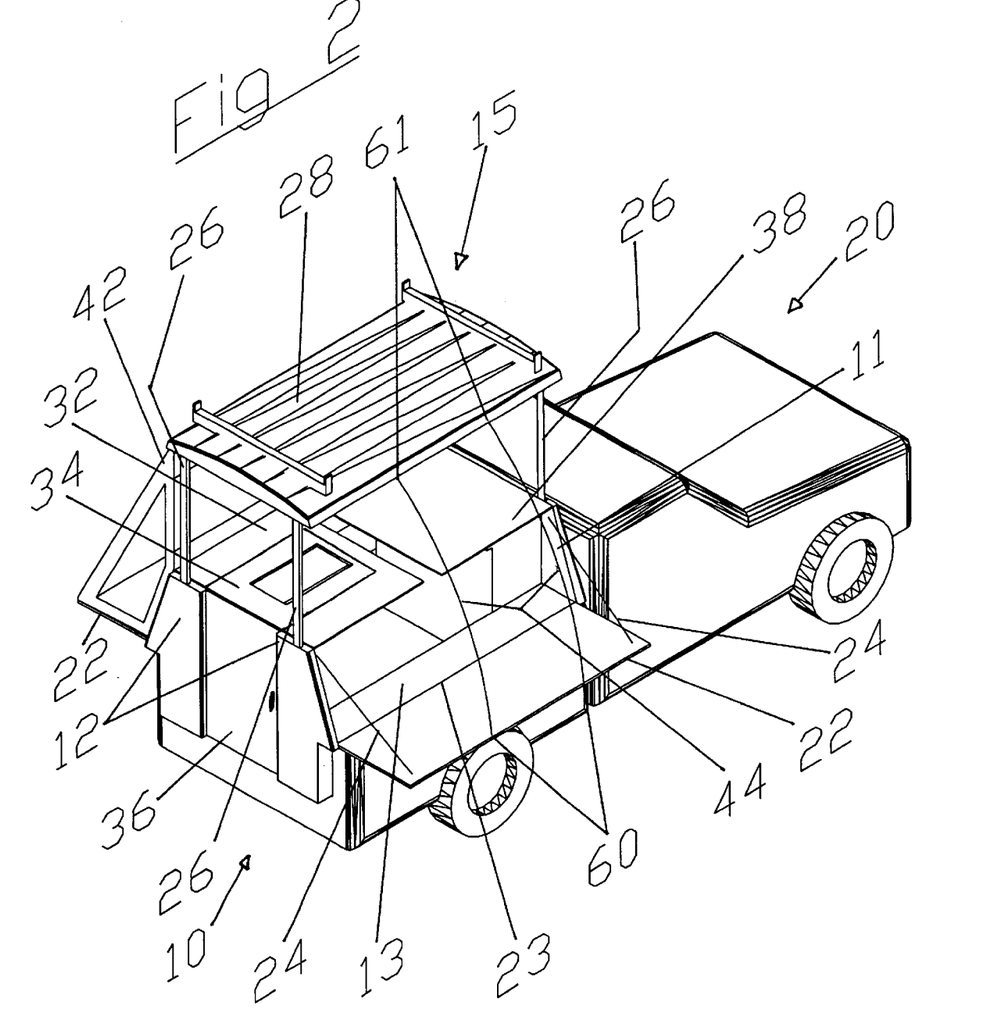
FIG. 2 shows a perspective view of the folding camper with one side enclosure removed to show internal components.
Figure 3:
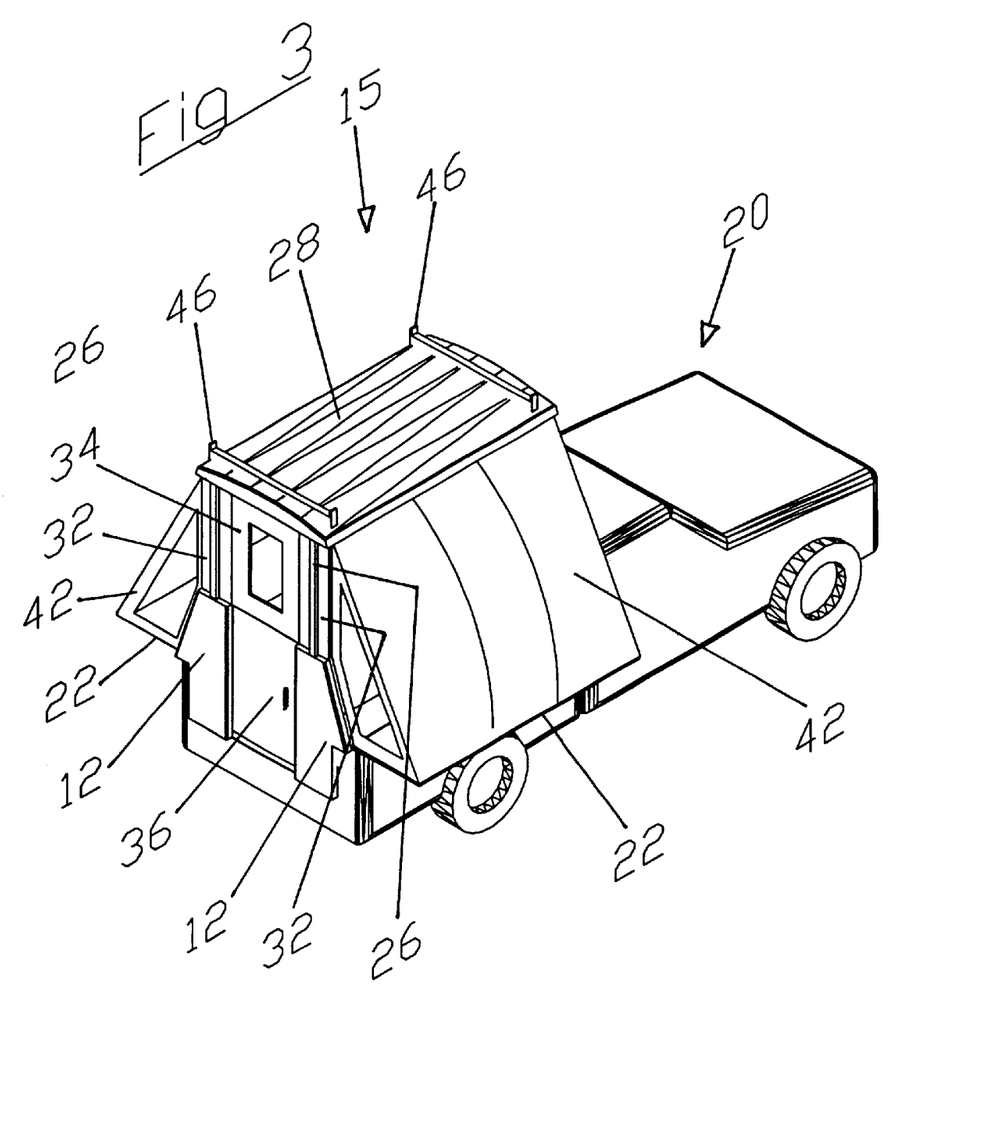
FIG. 3 shows a perspective view of the folding camper fully expanded and mounted in a pickup truck bed, ready for habitation.
Figure 4:
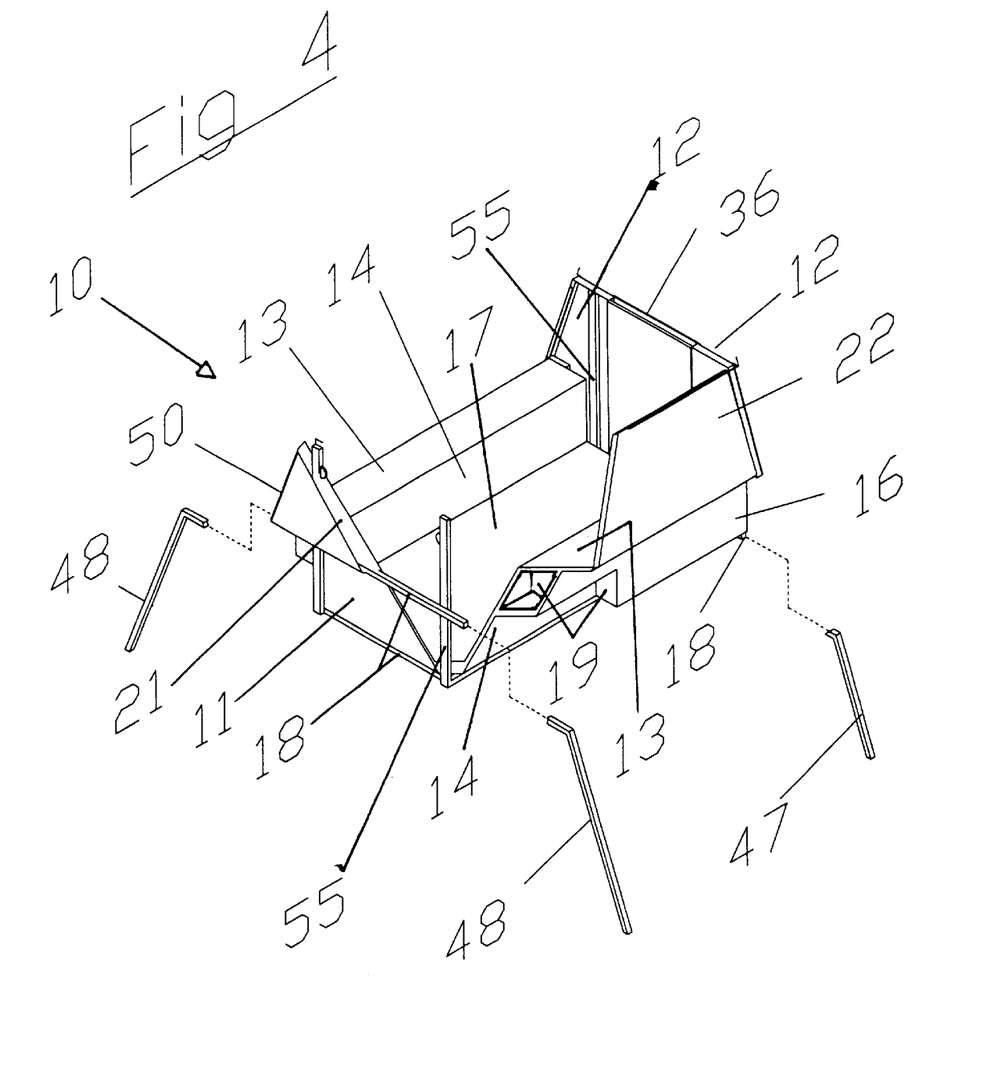
FIG. 4 shows a cutaway perspective view of the folding camper base assembly.
Figure 5:
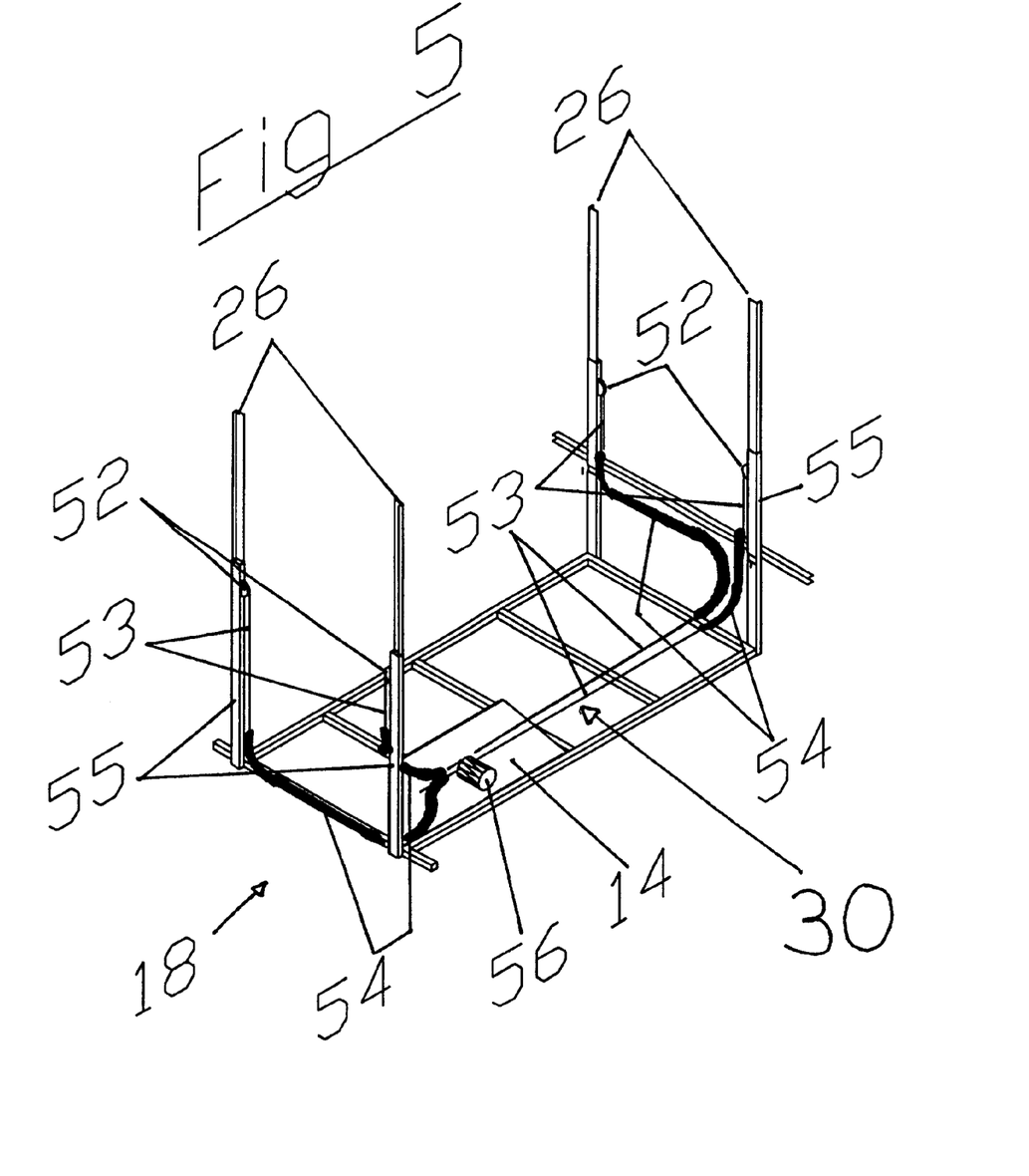
FIG. 5 shows a perspective view of the roof lifting mechanism and structural sub-frame.

A typical embodiment of folding camper 15 is shown in FIG. 2 (perspective view), FIG. 3 (perspective view with side enclosure removed), FIG. 4 (cutaway perspective view of the base assembly), and FIG. 5 (perspective view of the structural sub-frame and roof lifting mechanism). Base assembly 10 comprised front wall 11, rear wall 12, a pair of side platforms 13, a pair of inner side walls 14, a pair of outer side walls 16, a floor 17 and a structural sub-frame 18 is formed to fit on the floor of the bed of pickup truck 20. Inner sidewalls 14 and outer sidewalls 16 are connected to each other by a plurality of bulkheads 19 and to sub-frame 18, whereby a composite beam is created to increase rigidity and reduce weight. Side wings 22 are pivotally connected to side platforms 13 by a pair of side wing continuous hinges 23. A plurality of side wing cables 24 are attached to the distal corners of the side wings 22 and front wall 11 and rear wall 12, whereby side wings 22 are supported horizontally without external supports. A plurality of telescoping poles 26 are connected to roof 28 and a roof lifting mechanism 30. A rear upper panel 32 is pivotally connected to rear wall 12, whereby it can rotate from the vertical to the horizontal position. An upper door 34 is attached to rear upper panel 32. Lower door 36 is attached to rear wall 12. When upright, upper door 34 is removably connected to lower door 36, whereby they act as a single unit. A front upper panel 38 is pivotally connected to front wall 11, whereby it can rotate from a vertical to a horizontal position. A pair of side enclosures 42 are attached to roof 28, front wall 11, rear wall 12, and the outer edges of side wings 22. Side enclosures 42 are removably attached to the edges of rear upper panel 32 and front upper panel 38, whereby they can be fastened when the camper is expanded to provide a weather resistant enclosure for human habitation. A plurality of stays 44 are inserted in a plurality of lower stay receptacles 60 near the outer edges of side wings 22 and a plurality of upper stay receptacles 61 near the outer edges of roof 28, whereby side enclosures 42 are stretched taut. A front fairing 50 is attached to front wall 11, whereby the front of the camper is made aerodynamic and a storage space 21 is created. A pair of slanted rear corner jacks 47 and a pair of slanted front corner jacks 48 are removably attached to structural sub-frame 18, whereby folding camper 15 can be lifted off the pickup truck bed.

Roof lifting mechanism 30 is comprised of a plurality of pulleys 52, a plurality of lift cables 53, a plurality of cable raceways 54, and a winch 56. Winch 56 is attached to base assembly 10 within the cavity between inner sidewall 14 and outer side wall 16 on one side of the camper 15. Pulleys 52 are rotatably connected to a plurality of uprights 55 attached to structural sub-frame 18. Each lift cable 53 is attached to the bottom of one telescoping pole 26. Each telescoping pole 26 is slidably positioned within one upright 55. Each cable raceway 54 is attached to base assembly 10. Each lift cable 53 passes over the respective pulley 52 and through respective cable raceway 54 to winch 56 where it is attached, whereby the telescoping poles are raised by reeling lift cables 53 in with winch 56.

Operation—FIGS. 2 to 5

Folding camper 15 is positioned on the floor of the bed of pickup truck 20 in a folded state. Lower rear door 36 is opened to access winch 56. Winch 56 is turned to reel in lift cables 53 that raise telescoping poles 26 attached to roof 28. Roof 28 carries the top edge of side enclosures 42 upward until the bottom of telescoping poles 26 reach pulleys 52. Front upper panel 38 is rotated upward to a vertical position and is removably attached to roof.28. Rear upper panel 32 is rotated upward to a vertical position and is removably fastened to roof 28. Upper door 34 is removably attached to lower door 36. Side wings 22 are rotated downward to a horizontal position at the limits of extension of side wing cables 24. Side platforms 13 and side wings 22 connected together by continuous hinge 23 provide a horizontal sleeping surface larger than either alone. The lower edges of side enclosures 42 are fastened to the outside edges of side wings 22 and fold downward with them. The lower front and rear ends of side enclosures 42 are fastened to the outside edges of rear wall 12 and front wall 11. The upper front and rear ends of side enclosures 42 are removably attached to the outside edges of rear upper panel 32 and front upper panel 38 with hook and loop fasteners, snaps or other readily available attachment devices. The lower ends of stays 44 are inserted into lower stay receptacles 60 at the outer edge of side wings 42. The upper ends of stays 44 are inserted into upper stay receptacles 61 on the underside of roof 28, whereby side enclosure 42 is stretched taut. Folding camper 15 is now ready for human habitation.

Figure 6:
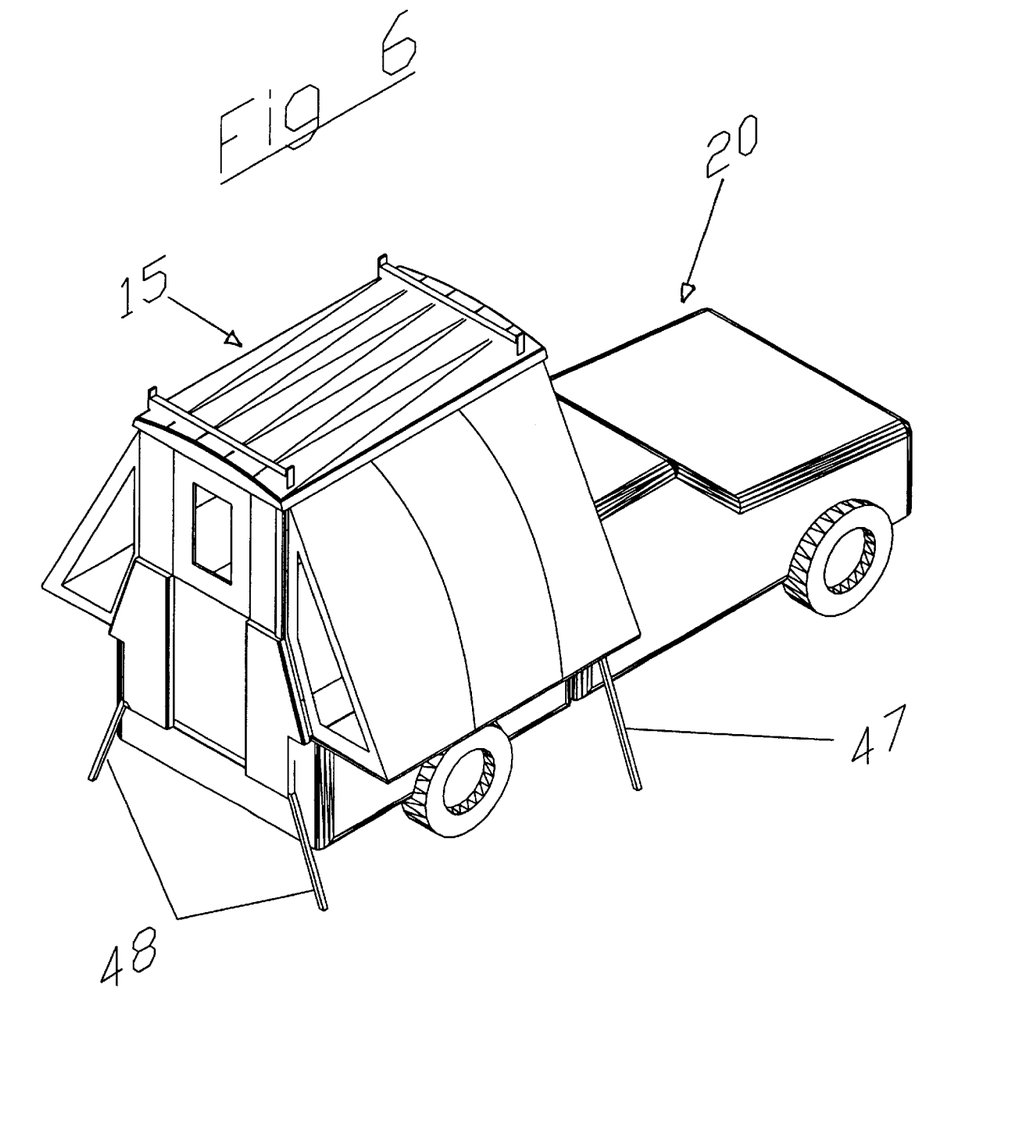
FIG. 6 shows a perspective view of the folding camper with slanted corner jacks in place to lift camper off pickup truck bed.
Figure 7:
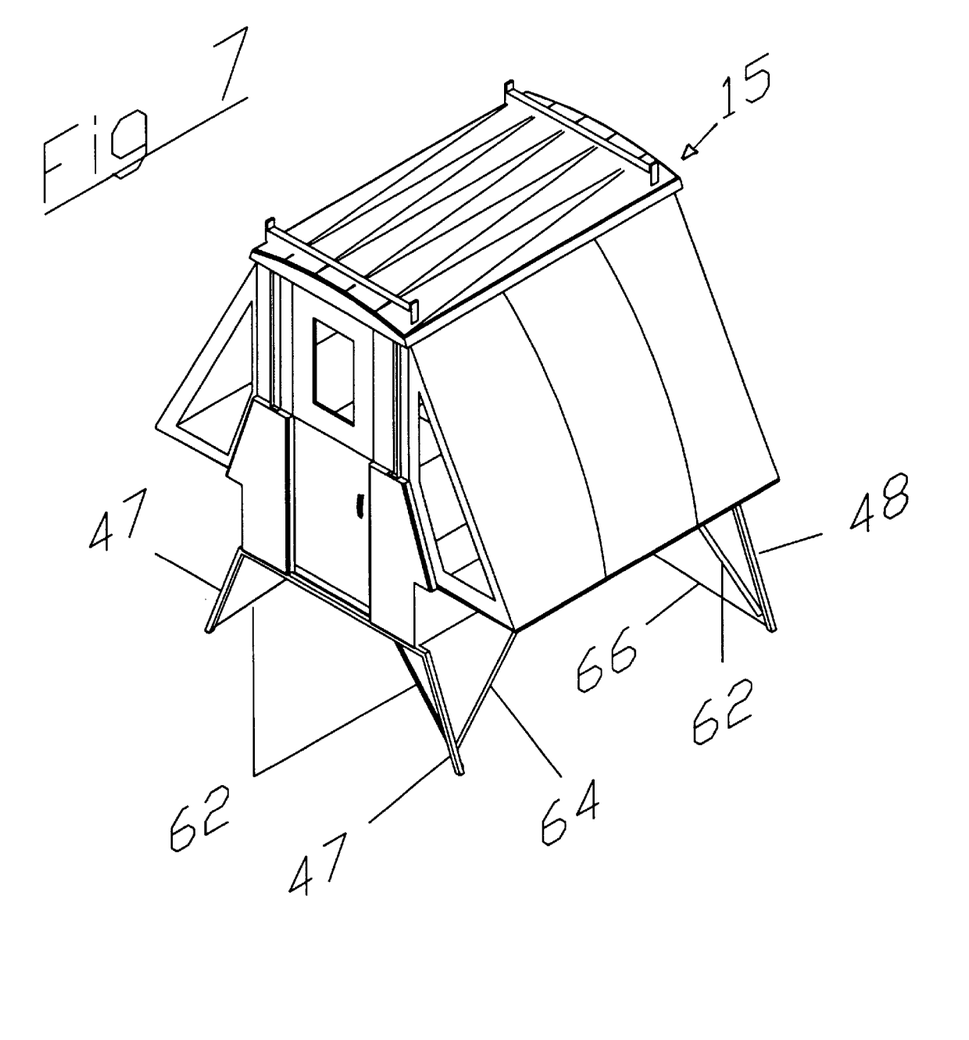
FIG. 7 shows a perspective view of the freestanding folding camper with tension straps and bracing in place for habitation off the pickup truck.
Figure 8:
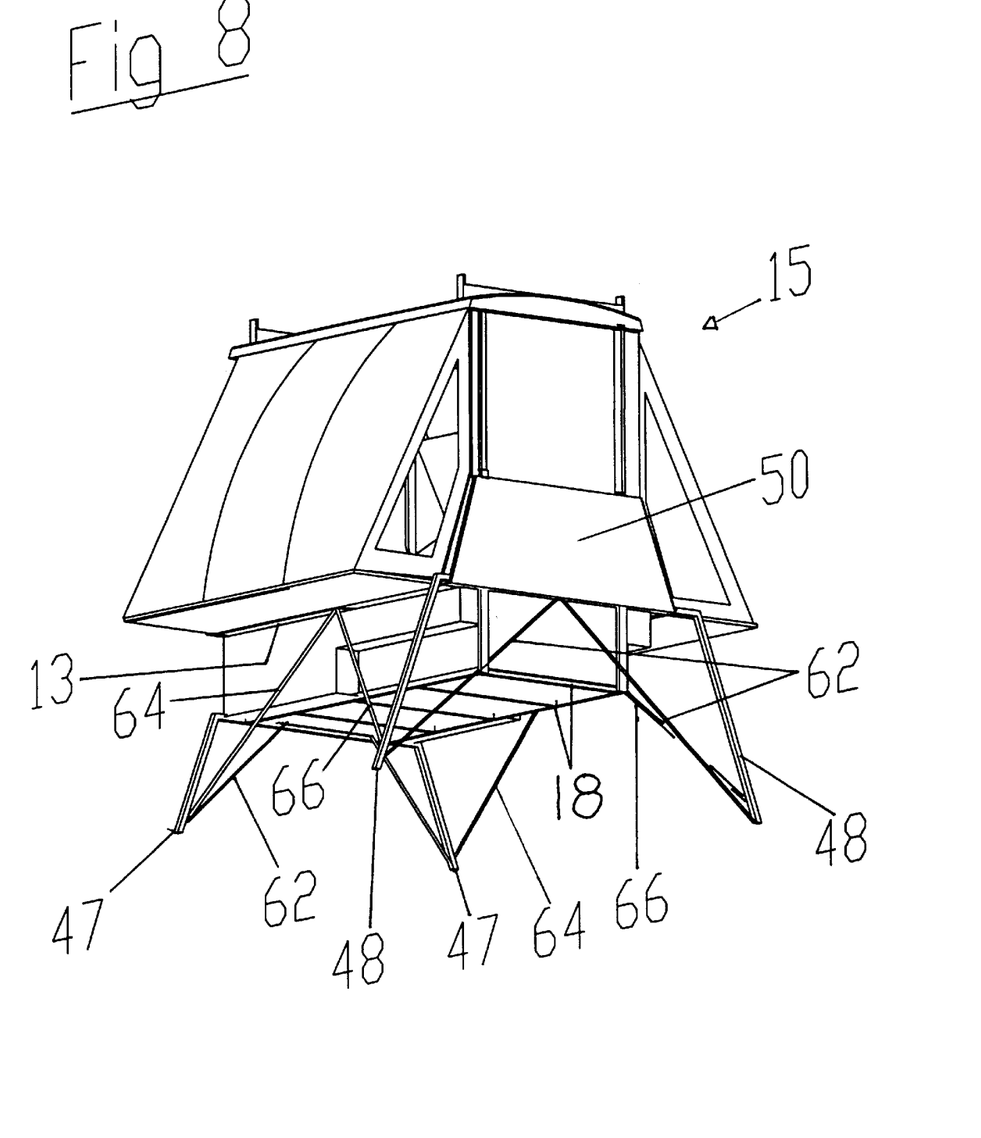
FIG. 8 shows a perspective view of the underside of the freestanding camper.

Description—FIGS. 6 to 8

Another embodiment of the present folding camper is shown in FIG. 6 (perspective view of the folding camper with slanted corner jacks in place for lifting), FIG. 7 (perspective view of camper off the pickup truck with braces and straps in place) and FIG. 8 (perspective view of the underside of the camper showing placement of braces and straps).

A pair of slanted rear corner jacks 47 are removably attached to the rear of structural sub-frame 18 near the outside corner. A pair of slanted front corner jacks 48 are removably attached to the front of structural sub-frame 18, whereby folding camper 15 can be lifted off the pickup truck bed and pickup truck 20 removed.

A pair of tension straps 62 are removably attached to structural sub-frame 18 and rear corner jacks 47 at the rear of the camper with hooks and eyes or other readily available attachments. A pair of tension straps 62 are removably attached to structural sub-frame 18 and front corner jacks 48 at the front of the camper, whereby folding camper 15 is braced laterally. A pair of rear braces 64 are removably attached to rear corner jacks 47 and the underside of side platforms 13 with bolts and wing nuts or other readily available fasteners. A pair of front braces 66 are removably attached to front corner jacks 48 and the underside of side platforms 13 with bolts and wing nuts or other readily available fasteners, whereby folding camper 15 is stabilized longitudinally and can be used for human habitation off the pickup truck.

Operation—FIGS. 6 to 8

Folding camper 15 is positioned on the floor of the bed of pickup truck 20. Slanted rear corner jacks 47 are removably attached to structural sub-frame 18 near the rear corners of base assembly 10. Slanted front corner jacks 47 are removably attached to structural sub-frame 18 near the front corners of base assembly 10. Comer jacks 47 and 48 are comprised of any well-known elevating structure such as screw jacks and the like. Corner jacks 47 and 48 are slanted to clear the sides of the pickup truck bed without the need for the corners of the folding camper to extend beyond the bed. Corner jacks 47 and 48 are also slanted so that they buttress the camper against lateral motion. Rear braces 64 are connected near the bottom of jacks 47 and to the underside of side platforms 13 near the center with bolts and wing nuts or other well known connection devices. Front braces 66 are connected near the bottom of jacks 48 and to the underside of side platforms 13 near the center with bolts and wing nuts or other well known connection devices, whereby folding camper 15 is fully braced laterally and longitudinally and can be used for habitation in a free standing configuration.

Conclusions, Ramifications, and Scope of the Invention:

Accordingly, the reader will see that the folding camper of this invention can be used as a portable camper on, or off, a compact or conventional, full sized pickup truck. That it can be conveniently expanded, closed, and removed. In addition the camper improves fuel efficiency and improves safety over current campers and can be used for storage and transport when closed. Furthermore the expanding camper has the additional advantages in that:

- it provides an expandable enclosure for mounting on a vehicle that is simple to operate and can be expanded by a single person,
- it provides an aerodynamic front profile that reduces wind resistance when in motion to reduce fuel consumption,
- it provides a low side profile to reduce the influence of side winds and increase stability and safety,
- it provides an enclosure that can remain on the vehicle and be used for other purposes such as transport and storage while in a closed position,
- it provides a habitation resistant to wind and water when expanded,
- it utilizes the structural properties of component materials to reduce weight and increase fuel efficiency,
- it provides for ease of removal from the vehicle by a single person,
- it provides lightweight bracing so that the camper can be used for habitation while off the vehicle,
- it utilizes maximum space within the pickup truck bed,
- it provides a folding camper that can be used with a compact pickup truck as well as conventional, full sized trucks,
- it provides for transport of elongated or bulky objects such as canoes, boats, pipes, or ladders on the roof.

Thus the reader will see that the folding camper of the invention provides a convenient, fuel efficient, and safe device that overcomes the disadvantages of previous devices.

While the above description contains many specificities, these should not be construed as limitations on the scope of the invention, but as merely providing illustrations of some of the presently preferred embodiments of this invention. Many other variations are possible. For example the device could be an integral part of a purpose-built camping or utility vehicle, it could be mounted on a trailer or as an integral part of one, it could be used with other types of vehicles or used as a temporary habitation without a vehicle. It could be used as a self-contained shipping container that could be shipped with supplies and unloaded and expanded at a remote site for habitation. The rigid folding upper panels could be replaced with fabric or other material. Conversely the flexible side enclosures could be replaced with rigid or semi-rigid enclosures. Finally, any of a number of other well-known roof elevating mechanisms could be used to raise and lower the roof.

Accordingly, the scope of the invention should be determined not by the embodiments illustrated, but by the appended claims and their legal equivalents.

I claim:

1. A folding camper system comprising:
   a. a base assembly positionable on the floor of the bed of a pickup truck including a horizontal platform on each side of said base assembly;
   b. a pair of side wings pivotally attached to said platforms, wherein said side wings rotate downward with respect to said base assembly when extended and rotate upward with respect to said base assembly when closed;
   c. a plurality of tension members attached to said base assembly and said side wings wherein said side wings are supported in a horizontal position without exterior supports and said side wings and said platforms together comprise a horizontal surface for sleeping larger than either alone;
   d. a roof attached to said base assembly by a roof lifting mechanism;
   e. an enclosure between said roof, said base assembly and said side wings when said roof is elevated.

2. The folding camper system of claim 1, wherein said base assembly is comprised of:
   a. a structural sub-frame;
   b. a floor;
   c. a front wall;
   d. a rear wall;
   e. a pair of inner side walls; and
   g. the horizontal platforms.

3. The folding camper system of claim 2, wherein the enclosure between said roof, said base assembly and said side wings when said roof is elevated is comprised of:
   a. an upper front panel pivotally attached to the front wall;
   b. an upper rear panel pivotally attached to the rear wall;
   c. an upper opening in said upper rear panel;
   d. a lower door attached to said rear wall;
   e. an upper door attached to said upper opening which, when upright, aligns with said lower door, whereby a full height door is provided;
   f. a pair of side enclosures attached to said roof, said front wall, said rear wall, and said side wings are removably attached to said upper front panel and said upper rear panel;
   g. a plurality of stays removably attached to said roof and said side wings, wherein said side enclosures are stretched taut.

4. The folding camper system of claim 1, wherein the roof lifting mechanism is comprised of:
   a. a plurality of hollow uprights attached to the base assembly;
   b. a plurality of telescoping support poles, each slidably positioned within said uprights and attached to said roof;
   c. a plurality of pulleys, each rotatably attached near the top of said uprights;
   d. a winch;
   e. a plurality of cable raceways beginning near said pulleys and terminating near said winch; and
   f. a plurality of cables connected to said telescoping support poles, that run over said pulleys, through said cable raceways and are connected to said winch.

5. The folding camper system of claim 1, further comprising:
   a. a plurality of slanted corner jacks removably connected to said base assembly.

6. The folding camper system of claim 5, including:
   a. a plurality of support braces removably attached to said base assembly and said slanted corner jacks;
   b. a plurality of tension straps removably attached to said base assembly and said slanted corner jacks.

7. A folding camper system comprising:
   a. a base assembly including a horizontal platform on each side of said base assembly;
   b. a pair of side wings pivotally attached to the outside edge of said platforms, wherein said side wings rotate upward to a near vertical position when closed;
   c. a front wall;
   d. a rear wall;
   e. a roof which, when lowered, overlaps the front wall, the rear wall, and said side wings;
   f. a lower opening in said rear wall;
   g. a lower door attached to said lower opening.

\* \* \* \* \*